Figure 5:
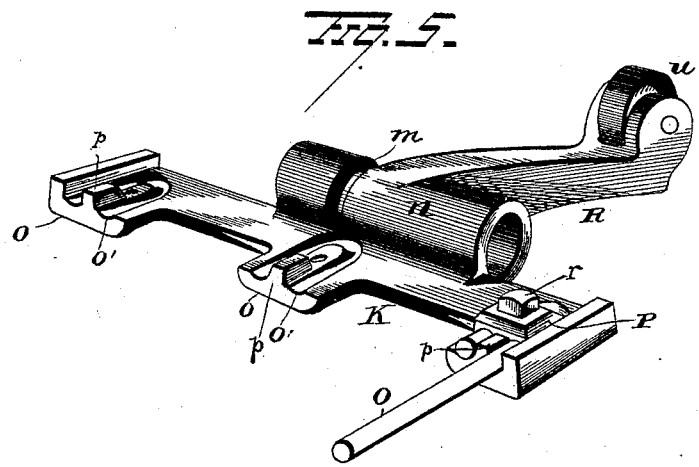

(No Model.) 4 Sheets—Sheet 1.
S. L. DENNEY.
COMBINED HAY TEDDER AND RAKE.
No. 395,550. Patented Jan. 1, 1889.
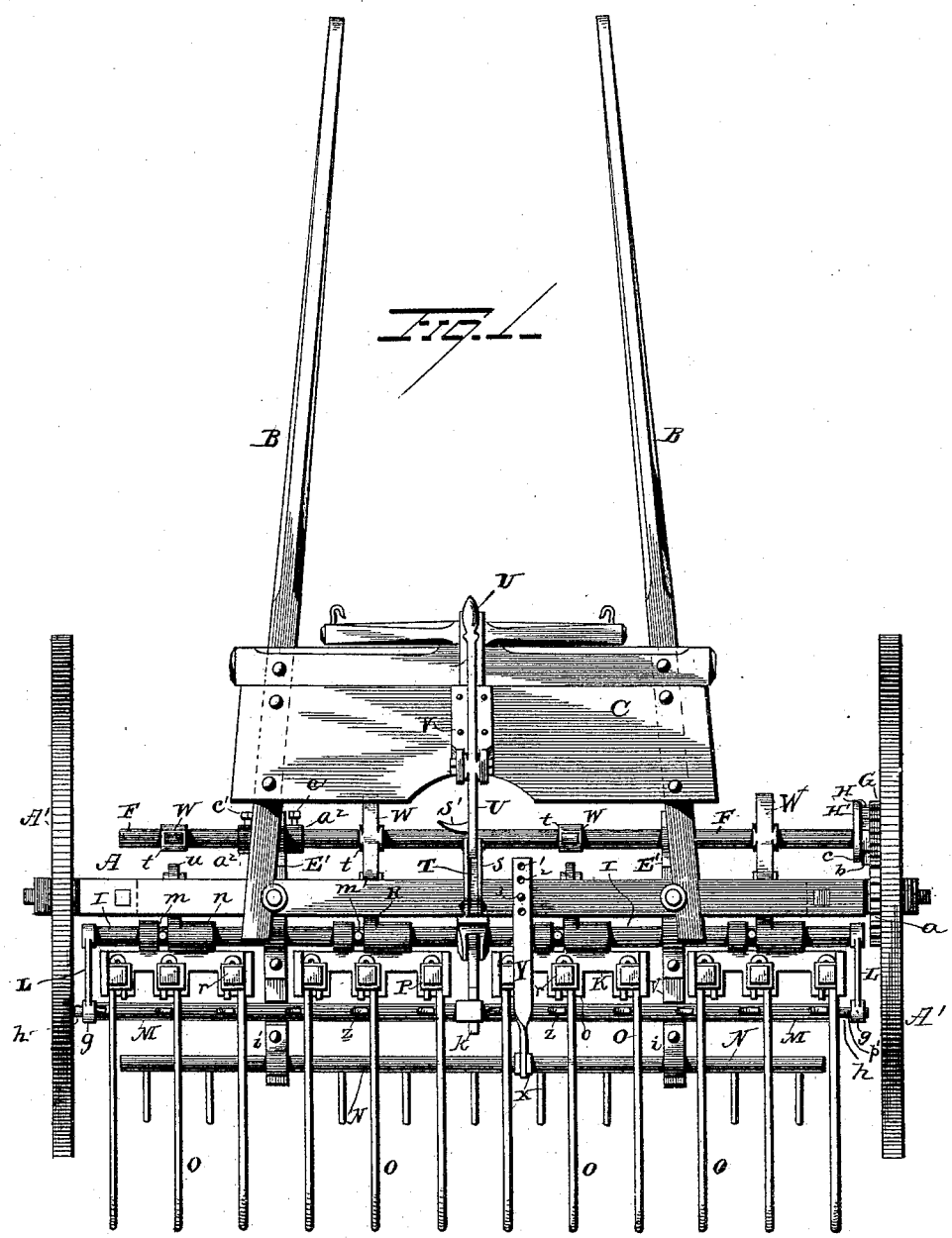

(No Model.)  4 Sheets—Sheet 2.
S. L. DENNEY.
COMBINED HAY TEDDER AND RAKE.
No. 395,550. Patented Jan. 1, 1889.
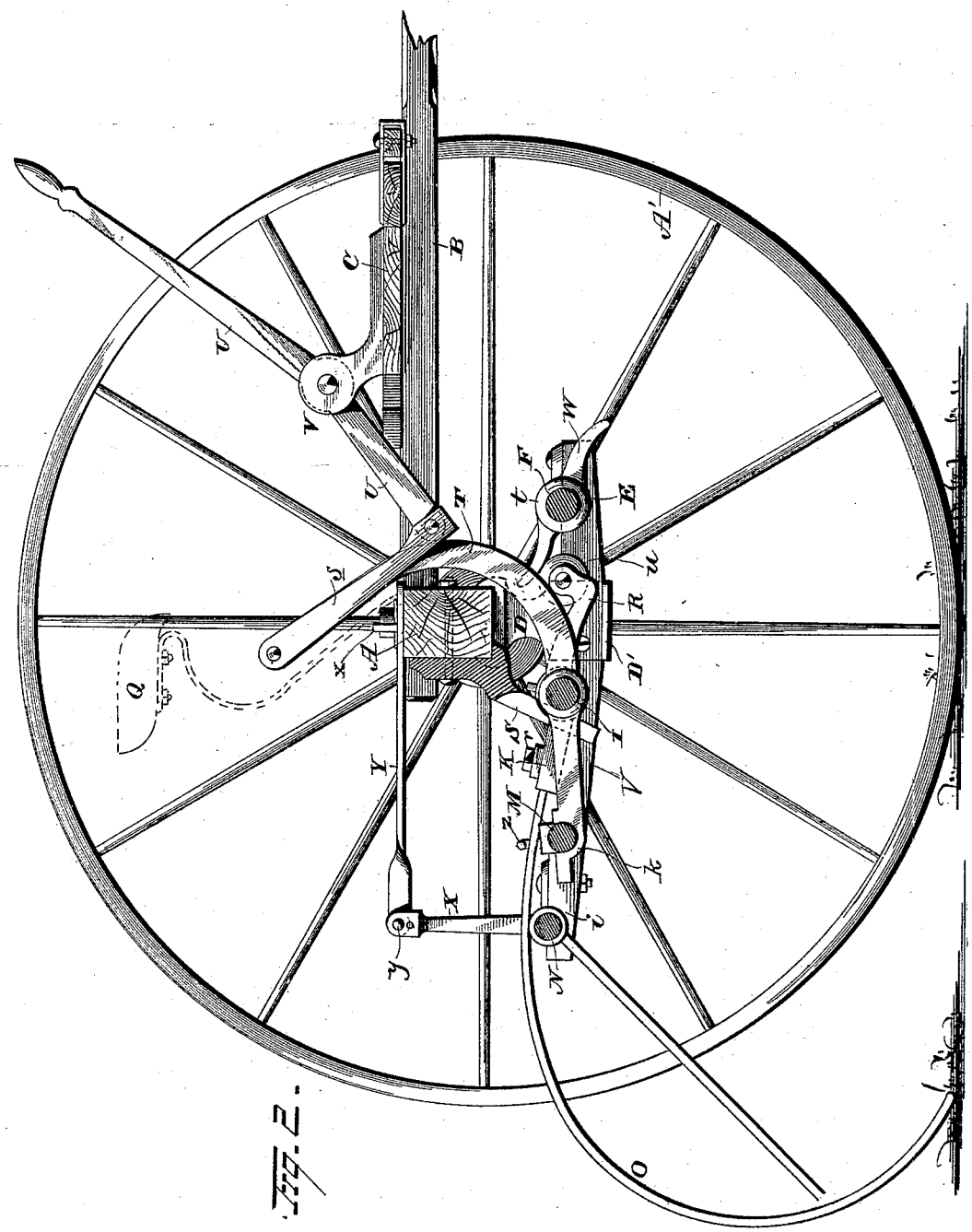

(No Model.)  4 Sheets—Sheet 3.
S. L. DENNEY.
COMBINED HAY TEDDER AND RAKE.
No. 395,550. Patented Jan. 1, 1889.
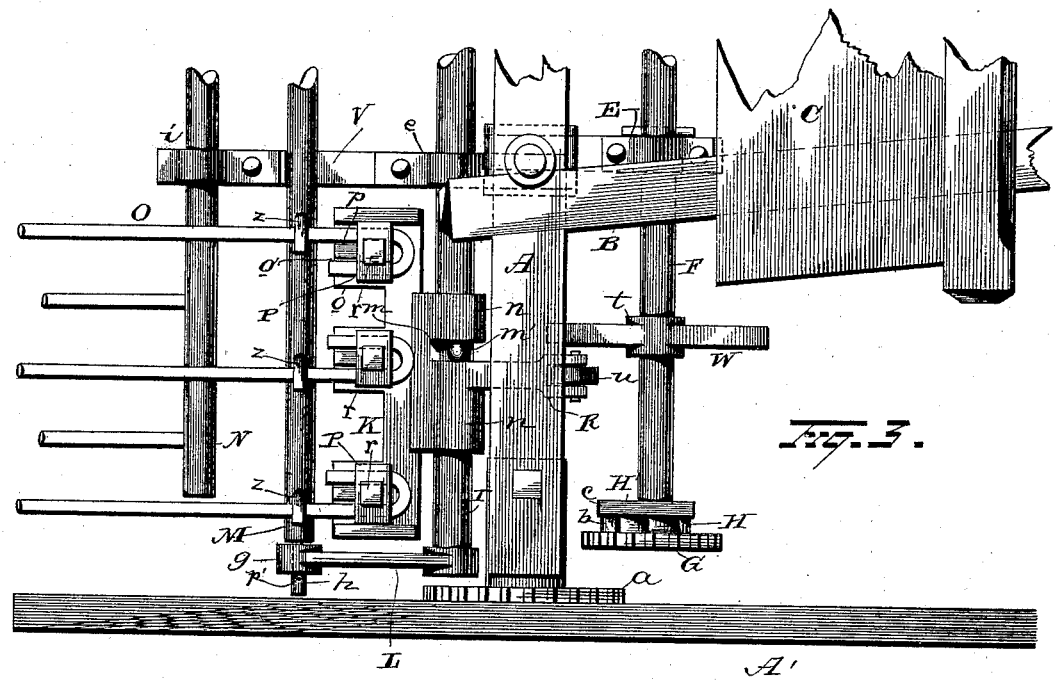
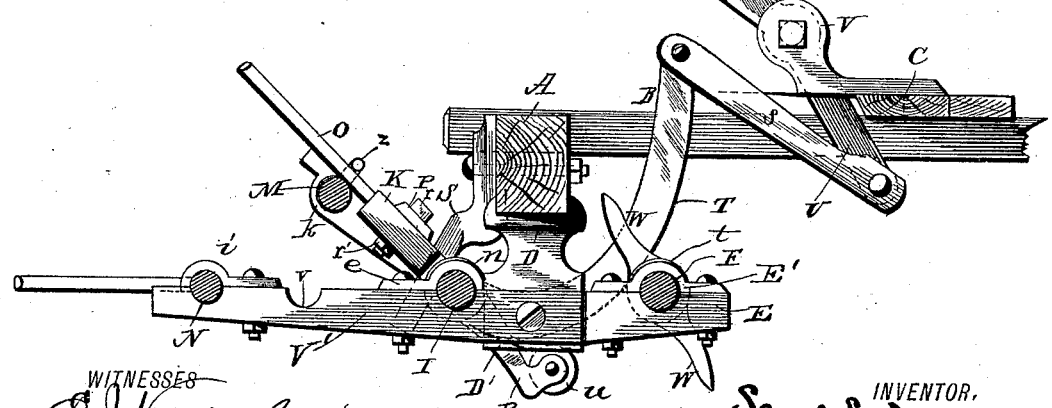
WITNESSES
INVENTOR
Attorney.

(No Model.) 4 Sheets—Sheet 4.

S. L. DENNEY.
COMBINED HAY TEDDER AND RAKE.

No. 395,550. Patented Jan. 1, 1889.

WITNESSES
INVENTOR,
Saml L. Denney.
Attorney

UNITED STATES PATENT OFFICE.

SAMUEL L. DENNEY, OF LANCASTER, PENNSYLVANIA, ASSIGNOR TO ISRAEL L. LANDIS, OF SAME PLACE, AND THE OHIO RAKE COMPANY, OF DAYTON, OHIO.

COMBINED HAY TEDDER AND RAKE.

SPECIFICATION forming part of Letters Patent No. 395,550, dated January 1, 1889.

Application filed December 29, 1886. Serial No. 222,889. (No model.)

*To all whom it may concern:*

Be it known that I, SAMUEL L. DENNEY, of Lancaster, in the county of Lancaster and State of Pennsylvania, have invented certain new and useful Improvements in Combined Hay Tedder and Rake; and I do hereby declare the following to be a full, clear, and exact description of the invention, such as will enable others skilled in the art to which it appertains to make and use the same.

My invention relates to an improvement in combined hay tedders and rakes.

In the curing of hay as ordinarily effected the operation is defective in that the hay is loosely and thinly scattered over the surface of the ground, and in this way the entire mass of fibers or stalks of grass is exposed to the direct rays of the sun. The scorching action thus incurred injures the quality of the hay by removing the nutritious juices that it is important to retain in the cured hay. To obviate this defect I have devised the combined rake and tedder herein shown and described. This by its operation as a tedder heaps the gathered hay into small cocks or flakes that are somewhat elevated and loosened. This position of the flakes permits the air to penetrate through them, and, as the mass of the hay is measurably protected from the direct burning influence of the sun, the quality of the cured hay is greatly improved in richness as well as appearance.

The object of this invention is to reduce the number of working parts and simplify them; also, to improve the dropping mechanism of the rake.

A further object is to provide an improved device for holding the rake-teeth to the tooth-sections or gang-plates.

A further object is to provide an improved method of suspending the tooth-sections to their shaft to insure the quick return of the teeth by gravity to ground contact.

A further object is to provide a novel and simple means of expeditiously changing the rake to a tedder, and the reverse.

A further object is to provide an improved means for changing the position of the clearing-teeth higher or lower, as may be desired.

A further object is to render this improved combined rake and tedder capable of quick production with a minimum expense for labor and material.

With these objects in view my invention consists in certain features of construction and combinations of parts, as will be hereinafter described, and pointed out in the claims.

Figure 6:
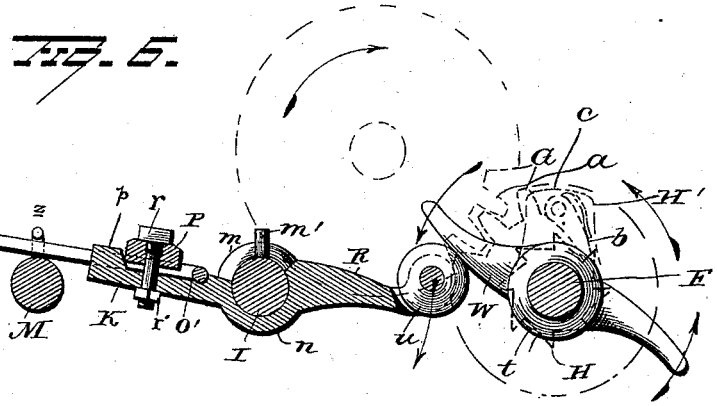

Referring to the drawings making a part of this specification, Figure 1 is a view in plan showing the teeth in position as a tedder. Fig. 2 is a transverse section of the device with parts connected as a tedder. Fig. 3 is a partial plan view with the tappets removed from contact with the tooth-sections to permit the machine to be used as a rake, the platform being removed to show the relative parts. Fig. 4 is a cross-section of the device coupled as a rake and in raised position of the teeth to drop a load therefrom. Fig. 5 is an enlarged view of a gang-plate or tooth-section plate that supports in operative position a certain number of the teeth independent of other sections of the same. Fig. 6 is an enlarged cross-section of the tappet-shaft and tooth-supporting shaft with a tooth-section and tappet connected to raise the tooth-section.

A represents the axle of the rake, preferably made of wood, and provided at opposite ends with metal spindles, to which the ground-wheels A' are secured by their properly-fitted hubs. The shafts or thills B are secured to the axle A, and upon their top surface at a proper point the platform C is affixed. To the under side of the axle A, near the outer side surface of each shaft, are rigidly attached the brackets D. These are provided with depending portions D', to which are attached the horizontal limbs E, the latter being provided on their forward ends with journal-boxes E'. These boxes E' support the shaft F in a horizontal position.

Upon the right side of the device, considered from the rear, the gear-wheel $a$ is firmly secured to the hub of the ground-wheel A', located on that end of the axle A, this toothed wheel $a$ being preferably made integral with the wheel-hub. Upon the right-hand end of the shaft F is loosely mounted the pinion G, made of a proper diameter and number of teeth to properly mesh with the gear-wheel $a$, formed integral or rigidly secured to the hub of the wheel A′. I prefer to so proportion these pinions that the larger wheel, G, will contain one-third more teeth than is formed in the smaller pinion, $a$; but I do not restrict myself to these proportions, as they can be changed somewhat without injuriously affecting the working of the tedder. The shaft F is so adjusted in its boxes as to permit an endwise movement, thus allowing the removal of the pinion-wheel G from its contact with gear-wheel $a$ on the hub of the ground-wheel, the shaft F being held in either adjustment desired by the collars $a^2$, secured on the inside of the box E′, and by slacking the set-screws $c'$ the collars $a^2$ may be moved laterally and permit the pinion G to be slid away from the driving-gear $a$ to prevent rotation of the shaft F when desired. The shaft F also has a ratchet-wheel, H, and a flanged hub, H′, mounted upon it between the supporting-box E and the side of the pinion G. The teeth of the ratchet-wheel H are engaged by a pawl, $b$, pivoted to the flange $c$ of the hub H′. The pawl is held by a proper spring in engagement with the teeth of the ratchet-wheel, and these teeth are so cut as to permit the pawl $b$ to slide upon the ratchet-serrations when the rake is moved backward, and so prevent an improper action of these working parts. The brackets D are also provided with two horizontal limbs, V′, made to project rearwardly a proper distance to furnish supports for the boxes $e$ and $i$, and also a support for the bar M when in depressed relation, the semicircular notches $v$, formed in the upper faces of the limbs V and just forward of the boxes $i$, being adapted to receive this bar. The boxes $e$ are intended to hold in a horizontal vibratory position the tooth-supporting shaft I. Upon the ends of the shaft I two arms, L, are affixed. These arms L are of the same length and have bosses on their free ends $g$, perforated for the reception of the bearing-bar M.

The bar M is preferably made round in the body and journaled at the ends, these journals $h$ being made to project a sufficient distance on each outer side of the arms L to permit a limited endwise movement of the bar M, for a purpose that will be shown.

Two rearwardly-projecting boxes, $i$, located near the extreme rearward end of the limbs V, support the clearer-bar N, which bar is located to the rear of the bar M and parallel with it. The clearer-bar N has an upwardly-projecting arm, X, secured at a central point on its body, and is provided with a number of tines or straight teeth that are given a proper position between the rake-teeth. The arm X has a link, Y, pivotally attached to its free end by pin $y$, which link Y extends forward and has a flattened free end perforated with several holes, 1 2 3, to engage with a projecting pin, $x$, affixed in the axle A at a point in line with this arm X. The arm X affords a means for the elevation or depression of the clearer-bar N to suit the operation of tedding or raking of the hay.

On the shaft I are loosely mounted the tooth-section plates K. These are shown in detail in Fig. 5. Any suitable number are placed on the shaft I a proper distance apart, a perforated boss, $n$, being formed integral with each tooth-plate to afford it support and permit a correct alignment of all the sections K on the shaft I, they being free to vibrate on the shaft when operated upon to cause such motion.

Each tooth-section K has a rearwardly-extending plate, $o$, formed integral with its other portions, this plate being formed flat on its top surface, and at regular intervals thereon grooved indentations $o'$ are made therein for the accommodation and secure holding in aligned position of the teeth O. These teeth O are made preferably of steel rods, and each tooth is composed of a rod bent at one end to form a loop with parallel sides, the width between these parts being so proportioned to the grooves in the plate $o$ as to permit the proper retention of the teeth in these grooves. Any proper number of these teeth may be located on a plate; but I have found it most convenient to provide three teeth secured, as just stated, to each section bracket-plate. The teeth are secured in place by a grooved bearing-washer, P, placed upon their top surfaces, a bolt, $r$, passing through a squared hole in each washer, the bolt being threaded on its lower end to receive a securing-nut, $r'$. A spacing-flange, $p$, projects from the face of the plate $o$ between the loop on each tooth and assists to hold it in proper position in relation to its supporting-plate K. The tooth-plates K are each provided with an arm, R, formed integral with the bosses $n$, said arms extending forward beneath the axle A and having their ends forked to form a support for an anti-friction roller, $u$. These rollers $u$ are provided for the impinging action of cam-tappets mounted on the shaft F, as will be explained. The bosses $n$ are slotted at a point, $m$, on their upper sides. These slots $m$ are made for the reception of the studs or pins $m'$, that project a proper distance from the body of the shaft I to engage these slots, the slots being of a sufficient length to permit a proper swinging movement of the tooth-holding plates K upon their supporting-shaft I. This method of securing these plates holds them from lateral displacement, while it permits vertical oscillation.

The construction of the tooth-sections K, having their rearward projections, $o$, extending some distance to the rear of the shaft I, on which they oscillate, proves of great advantage in practice, as the weight of these sections, together with the attached teeth O, aids by their gravity the quick return of the teeth to the ground when the tedder is in use. The teeth O are made in the usual form to curve rearwardly and downwardly, and are of such a relative length in regard to location on their shaft as to permit an engagement with the ground surface when depressed by design of the operator or through the action of the "tedding-gear."

At the center of the axle A a forked bracket, S, is secured to its rear side, its limbs extending downward and rearward a short distance. Upon the shaft I, at a point between the jaws of the bifurcated bracket S, the bent lever T is rigidly secured, this lever T extending rearward a sufficient distance to loosely embrace, by means of a perforated boss, $k$, on its free end, the body of the bearing-bar M.

The opposite end of the lever T is curved upward and extends in a vertical direction in front of and above the body of the axle A. At the upper termination of the lever T a link, $s$, is pivoted, and the lower end of this link $s$, which is carried to a point in advance of its upper end, is pivotally secured to the lower end of the upright lever U, that is swing-supported by a forked bracket-plate, V, being affixed firmly to the rear edge and top surface of the platform C. At a point where the lever U pivots to the link $s$ a foot-bar, S', is attached for the purpose of allowing the operator to hold by foot-pressure the teeth of the rake elevated from engagement with the grass when the rake is being turned. This will release both hands of the driver to control the horse, if it is necessary, when the machine is being turned around, as stated.

On the shaft F, at proper points, are secured the tappets W by their hubs $t$. These tappets W are preferably made with two arms suitably curved to engage the wheels $u$ on the ends of the arms R of the tooth-plates K, the number of tappet-hubs and plates being alike. The position assigned to the tappets W must be such that when the gear-wheel on the end of the shaft F is in engagement with its driving gear-wheel on the hub of the ground-wheel A' the tappets will be directly opposite the bracketed anti-friction rollers on the arms of the tooth-plates K, the relative location of their respective shafts F and I being such as to permit the curved tappet-arms on these rollers to lift the tooth-sections a proper distance, and thus raise the teeth of the rake sufficiently to drop a load when necessary.

The tappet-arms for each tooth-plate K are preferably set out of a direct line with each other, so that their opposed tooth-sections K will be operated upon successively. This method of construction is available when the device is to be used as a tedder.

Upon the bearing-bar M are placed the small bent hooks $z$, these being so formed as to project over and bear upon each tooth of a section when the bar is shifted to use as a rake, one of these plates being furnished for each tooth, the bearing-bar M being intended to support the teeth O in place and hold them firm while in use as a rake. The extended journals $h$ on the bar M will permit the bar to be shifted endwise when the rake is to be changed into a tedder, this endwise movement carrying the hooks $z$ away from the teeth O, and thus permit them to rise and fall successively by the action of the tappet-arms upon their section-wheels $u$.

A seat, Q, is fixed in a convenient position to the hand-lever U, so that the hand and foot of the driver may be used with proper effect when the vibration of this lever U is necessary to discharge a load from the teeth of the rake to form the raked hay into windrows.

In operating the machine as a "tedder" the shaft F is gear-connected with the ground-wheel A', so that the tappets W will be in line with the arm R of the tooth-plates K. Forward motion being given to the tedder, the revolution of the shaft F will operate the tooth-sections K successively, and there will be, by the alternating successive rise and fall of the tooth-sections K, a series of small loose flakes or elevated heaps of the hay arranged at spaced intervals over the field, the weight of the tooth-sections from their point of bearing on the shaft I causing a quick return to the grass of the tooth-points when released from the tappet-arms W. When used as a tedder, the clearing-bar N, with its affixed teeth, must be lowered to permit a closer adjustment of these teeth with regard to the curved teeth O, as the operation of tedding the hay to cure it does not require so great a lift of these teeth O to accomplish the desired result.

The change the machine to rake hay, the gear-wheels are disconnected by loosening the collars $a^2$ on the shaft F and sliding the shaft endwise sufficiently to remove the pinion G from meshing with its driving gear-wheel attached to the ground-wheel A'. This will remove the tappets on the shaft F from the arms of the tooth-plates K, and also, as is evident, will prevent a rotation of the shaft F, on which these tappets are mounted. The bar M is now shifted endwise sufficiently to cause the hooks $z$ to slide over and bear upon the top edges of the teeth O, and in this way hold these teeth from undue vibration, and, further, to enable the operator to have full control of their connected operation to discharge a load from them by the use of the lever U. The bar M is held in proper position for raking purposes by a pin, $p'$, inserted in a hole made in the body of the journaled end $h$ of this bar, the perforation being made outside the arm L, that sustains the journaled bar M. This bar, being slid to bring the hooks $z$ over the teeth, is held firmly by the simple means indicated. When the bar M is shifted in an opposite direction to remove the hooks $z$ from engaging the teeth O to change to a tedder, the perforation for the pin $p'$ will be moved to line with the other side of the bracket-arm L, and the pin $p'$, being inserted in this hole, will retain the bar M in this free position to allow the tooth-section plates K to be successively acted upon by the tappet-arms.

It is obvious that without any radical change of the parts of this machine a tongue or draft-pole may be substituted for a pair of thills or shafts, and I desire to have it understood that in some cases I may prefer to make this change to suit the land and crop to be operated upon.

It is evident that other slight changes in the construction and relative arrangement of the several parts might be made without departure from the spirit or exceeding the scope of my invention; hence I do not wish to restrict myself to the exact forms of construction shown, but claim reasonable latitude to make such changes as will fall within the spirit and scope of this invention.

Having fully described my invention, what I claim as new, and desire to secure by Letters Patent, is—

1. In a horse hay rake and tedder, the combination, with an axle, rearwardly-projecting limbs rigidly secured to said axle, the ground-wheels on the axle, and draft attachment, of a driving gear-wheel, a meshing pinion, a longitudinally-adjustable tappet-supporting shaft located in front and below the axle, a tooth-supporting shaft mounted in bearings on said rearwardly-projecting limbs, tooth-section plates mounted on the rear shaft, and corresponding tappets mounted on the front shaft, the tappets being adapted to bear on and elevate the tooth-plates, substantially as set forth.

2. The combination, with an axle, forwardly-projecting limbs carrying a tappet-shaft, the latter adapted to be moved endwise a limited distance, and a series of tappets mounted on said shaft, of rearwardly-projecting limbs secured to the axle, a shaft mounted in said limbs, and tooth-plates on the shaft adapted to be engaged by the tappets when the machine is operating as a tedder, substantially as set forth.

3. In a horse hay-rake, the combination, with an axle mounted on wheels and a driving gear-wheel, of a shaft carrying a series of independently-movable tooth-plates, teeth secured to said plates, a bar having hooks or loops adapted to engage the teeth of the several series and lock them against independent movement, a longitudinally-movable shaft carrying a gear-wheel adapted to engage the driving-gear, and tappets mounted on said shaft, substantially as set forth.

4. In a horse hay rake and tedder, the combination, with an axle and a rake-head mounted on a shaft, of a forked bracket-plate made to straddle a boss on a lever rigidly secured to the head-sustaining shaft, so as to permit a rise-and-fall motion of this lever, and at the same time prevent an end-play of the tooth-sustaining shaft, substantially as set forth.

5. In a horse hay-rake, the combination, with an axle and the two rearwardly-projecting limbs secured thereto, of a longitudinally-adjustable tappet-shaft, a tooth-supporting shaft journaled in boxes in said rearwardly-projecting limbs, tooth-sections mounted on said shaft and adapted to be engaged by tappets on the tappet-shaft, and a clearer-bar journaled in the outer ends of the limbs, substantially as set forth.

6. In a horse hay rake and tedder, the combination, with an axle, rearwardly-projecting limbs secured thereto, a tooth-supporting shaft journaled in boxes in the limbs, and a clearer-bar journaled in said limbs, near the rear ends thereof, of the longitudinally-adjustable tappet-shaft and the tappets mounted thereon to engage the arms of the tooth-sections, substantially as set forth.

7. In a horse hay rake and tedder, the combination, with an axle, a suitable draft attachment, and two wheels mounted on the axle, of a gear-actuated longitudinally-adjustable tappet-shaft located in front of the axle, rearwardly-projecting limbs secured to the axle, a series of tooth-sections mounted on a shaft journaled in rearwardly-projecting limbs, tappets mounted on the tappet-shaft and adapted to engage the tooth-sections and elevate them a limited distance, and a clearer-bar journaled in said limbs and provided with its downwardly-projecting teeth, substantially as set forth.

8. In a horse rake and tedder, the combination, with a toothed section-plate having projections for two or more teeth, each projection having a substantially U-shaped groove in its face and a centrally-located spacing-flange between the ends of said groove, said flange being cut away at its forward end to form a seat for a washer, of a tooth bent into U form at its upper end, and a washer, bolt, and nut for each tooth, substantially as set forth.

9. In a horse rake and tedder, the combination, with an axle, a longitudinally-adjustable tappet-shaft mounted in front of the axle, and tappets secured thereon, of the rearwardly-projecting limbs, a tooth-shaft journaled therein to the rear of the axle, tooth-sections mounted on said shaft and carrying teeth, arms rigidly secured to said tooth-sections and extending forward into the path of the tappets, and the adjustable tooth-bearing bar mounted in said arms and adapted to rest upon extensions of the rearwardly-projecting limbs when in its lowered position, substantially as set forth.

10. In a horse rake and tedder, the combination, with an axle, rearwardly-projecting arms secured thereto, and a clearer-bar journaled in said arms and provided with teeth, of an arm rigidly secured to the clearer-bar, and a link pivoted to the upper end of said arm and having a series of perforations in its forward end, said perforations being adapted to receive a pin on the axle to vary the inclination of the clearer-teeth, substantially as set forth.

11. The tooth-sections consisting, essentially, of a plate having a slotted boss or bearing and projections, each of which is grooved and perforated and provided with a spacing-flange, and the washers, bolts, and nuts for securing the teeth to the sections, substantially as set forth.

12. In a horse hay rake and tedder, the combination, with an axle, a pair of shafts, two wheels, and a platform on the shafts, of a geared longitudinally-adjustable tappet-shaft, tappets placed fixedly on this shaft, a tooth-supporting shaft, tooth-carrying section-plates mounted on this shaft, teeth affixed to these plates, the section-plates being adapted to engage with the tappets for a limited vertical movement, a tooth-bearing bar provided with a lever to operate it and raise or lower the rake-teeth, and a clearer-bar, substantially as set forth.

In testimony whereof I have signed this specification in the presence of two subscribing witnesses.

SAMUEL L. DENNEY.

Witnesses:
JOHN W. APPEL,
A. N. HOSTETTER.